(12) United States Patent
Gardner

(10) Patent No.: US 8,732,135 B1
(45) Date of Patent: May 20, 2014

(54) RESTORING A BACKUP FROM A DEDUPLICATION VAULT STORAGE

(71) Applicant: Storagecraft Technology Corporation, Draper, UT (US)

(72) Inventor: Andrew Lynn Gardner, Salt Lake City, UT (US)

(73) Assignee: Storagecraft Technology Corporation, Draper, UT (US)

( * ) Notice: Subject to any disclaimer, the term of this patent is extended or adjusted under 35 U.S.C. 154(b) by 0 days.

(21) Appl. No.: 13/782,822

(22) Filed: Mar. 1, 2013

(51) Int. Cl.
*G06F 17/30* (2006.01)
*G06F 11/14* (2006.01)

(52) U.S. Cl.
CPC .................................. *G06F 11/14* (2013.01)
USPC ........................................................ 707/679

(58) Field of Classification Search
CPC .............................. G06F 11/14; G06F 11/1453
USPC ........................................................ 707/679
See application file for complete search history.

(56) References Cited

U.S. PATENT DOCUMENTS

| | | | | |
|---|---|---|---|---|
| 4,853,843 | A * | 8/1989 | Ecklund ................................ | 1/1 |
| 5,623,608 | A * | 4/1997 | Ng ................................ | 711/137 |
| 5,765,173 | A * | 6/1998 | Cane et al. ................... | 707/640 |
| 5,778,430 | A * | 7/1998 | Ish et al. ....................... | 711/133 |
| 5,991,858 | A * | 11/1999 | Weinlander ................... | 711/163 |
| 6,148,412 | A * | 11/2000 | Cannon et al. ............... | 714/6.31 |
| 6,760,840 | B1 * | 7/2004 | Shimbo et al. ............... | 713/165 |
| 6,912,629 | B1 | 6/2005 | West et al. | |
| 7,330,997 | B1 * | 2/2008 | Odom ........................ | 714/6.23 |
| 7,337,286 | B1 | 2/2008 | West et al. | |
| 7,447,854 | B1 | 11/2008 | Cannon | |
| 7,529,785 | B1 * | 5/2009 | Spertus et al. ........................ | 1/1 |
| 7,653,668 | B1 * | 1/2010 | Shelat et al. .................. | 707/610 |
| 7,783,600 | B1 * | 8/2010 | Spertus et al. ............... | 707/622 |
| 7,873,601 | B1 * | 1/2011 | Kushwah ...................... | 707/654 |
| 7,925,623 | B2 | 4/2011 | Therrien et al. | |
| 7,962,452 | B2 | 6/2011 | Anglin | |
| 8,037,032 | B2 | 10/2011 | Pershin et al. | |
| 8,041,677 | B2 * | 10/2011 | Sumner et al. ............... | 707/640 |
| 8,055,613 | B1 | 11/2011 | Mu et al. | |
| 8,086,569 | B2 | 12/2011 | Jasrasaria | |
| 8,099,572 | B1 * | 1/2012 | Arora et al. ................... | 711/162 |
| 8,117,410 | B2 | 2/2012 | Lu et al. | |
| 8,131,924 | B1 | 3/2012 | Frandzel et al. | |
| 8,190,836 | B1 * | 5/2012 | Zheng et al. .................. | 711/162 |

(Continued)

OTHER PUBLICATIONS

Article Title: "10800: Acronis Backup & Recovery 10: Deduplication Best Pratices"; Date: Created—May 11, 2012; Updated Jan. 13, 2012; Webpage: http://kb.acronis.com/content/10800.*

(Continued)

*Primary Examiner* — Sheree Brown
(74) *Attorney, Agent, or Firm* — Maschoff Brennan

(57) ABSTRACT

Restoring a backup from a deduplication vault storage. In one example embodiment, a method of restoring a backup from a deduplication vault storage includes various steps. First, entries in a list of unique blocks in a backup of a source storage at a point in time are ordered according to locations of corresponding unique blocks as stored in a vault storage. Then, the corresponding unique blocks are read in the order from the vault storage. Next, communication is established between the vault storage and a restore storage. Then, the corresponding unique blocks are stored in the restore storage.

20 Claims, 8 Drawing Sheets

(56) References Cited

U.S. PATENT DOCUMENTS

| | | | |
|---|---|---|---|
| 8,281,099 B2* | 10/2012 | Kishi | 711/162 |
| 8,285,681 B2 | 10/2012 | Prahlad et al. | |
| 8,335,770 B2* | 12/2012 | Merchant et al. | 707/682 |
| 8,364,641 B2 | 1/2013 | Hirsch | |
| 8,380,678 B2 | 2/2013 | Manson | |
| 8,407,186 B1 | 3/2013 | Cremelie et al. | |
| 8,682,870 B1 | 3/2014 | Gardner | |
| 2002/0073276 A1 | 6/2002 | Howard et al. | |
| 2003/0105810 A1* | 6/2003 | McCrory et al. | 709/203 |
| 2003/0204609 A1* | 10/2003 | Anderson et al. | 709/229 |
| 2004/0267836 A1* | 12/2004 | Armangau et al. | 707/203 |
| 2005/0216665 A1 | 9/2005 | Takakuwa | |
| 2005/0240813 A1* | 10/2005 | Okada et al. | 714/14 |
| 2006/0064416 A1* | 3/2006 | Sim-Tang | 707/6 |
| 2006/0173935 A1 | 8/2006 | Merchant et al. | |
| 2007/0100913 A1* | 5/2007 | Sumner et al. | 707/204 |
| 2007/0136200 A1* | 6/2007 | Frank et al. | 705/50 |
| 2008/0005141 A1 | 1/2008 | Zheng et al. | |
| 2008/0184001 A1 | 7/2008 | Stager | |
| 2008/0208933 A1 | 8/2008 | Lyon | |
| 2008/0235306 A1* | 9/2008 | Kim et al. | 707/206 |
| 2008/0244204 A1* | 10/2008 | Cremelie et al. | 711/162 |
| 2008/0307347 A1* | 12/2008 | Cisler et al. | 715/771 |
| 2009/0164529 A1* | 6/2009 | McCain | 707/204 |
| 2009/0204649 A1 | 8/2009 | Wong et al. | |
| 2009/0204765 A1* | 8/2009 | Gupta et al. | 711/133 |
| 2009/0254507 A1 | 10/2009 | Hosoya et al. | |
| 2010/0076934 A1 | 3/2010 | Pershin et al. | |
| 2010/0191748 A1 | 7/2010 | Martin et al. | |
| 2010/0257142 A1* | 10/2010 | Murphy et al. | 707/681 |
| 2010/0260187 A1 | 10/2010 | Ongole et al. | |
| 2011/0010498 A1 | 1/2011 | Lay et al. | |
| 2011/0016083 A1 | 1/2011 | Patterson | |
| 2011/0173605 A1 | 7/2011 | Bourne | |
| 2011/0218969 A1* | 9/2011 | Anglin et al. | 707/679 |
| 2011/0238775 A1 | 9/2011 | Wu et al. | |
| 2011/0276737 A1 | 11/2011 | Mel et al. | |
| 2012/0079221 A1 | 3/2012 | Sivasubramanian et al. | |
| 2012/0109894 A1 | 5/2012 | Kishi | |
| 2012/0136832 A1* | 5/2012 | Sadhwani | 707/640 |
| 2012/0136834 A1* | 5/2012 | Zhao | 707/649 |
| 2012/0150949 A1 | 6/2012 | Vijayan Retnamma et al. | |
| 2012/0151177 A1 | 6/2012 | Kalach et al. | |
| 2012/0151586 A1 | 6/2012 | Hentunen | |
| 2012/0158660 A1* | 6/2012 | Hirsch | 707/640 |
| 2012/0198219 A1* | 8/2012 | Preimesberger et al. | 713/2 |
| 2012/0246457 A1 | 9/2012 | Sosnosky et al. | |
| 2013/0024424 A1 | 1/2013 | Prahlad et al. | |
| 2013/0042083 A1* | 2/2013 | Mutalik et al. | 711/162 |
| 2013/0046944 A1* | 2/2013 | Domyo et al. | 711/162 |
| 2013/0138620 A1* | 5/2013 | Yakushev et al. | 707/698 |
| 2013/0179407 A1 | 7/2013 | Stoakes | |

OTHER PUBLICATIONS

U.S. Appl. No. 13/782,986, filed Mar. 1, 2013 tiled "Defragmentation During Multiphase Deduplication".
U.S. Appl. No. 13/782,807, filed Mar. 1, 2013 tiled "Change Tracking for Multiphase Deduplication".
U.S. Appl. No. 13/782,549, filed Mar. 1, 2013 tiled "Multiphase Deduplication".
U.S. Appl. No. 13/782,717, filed Mar. 1, 2013 tiled "Deduplication Vault Storage Seeding".
U.S. Appl. No. 13/782,957, filed Mar. 1, 2013 tiled "Local Seeding of a Restore Storage for Restoring a Backup From a Remote Deduplication Vault Storage".
U.S. Appl. No. 13/782,807, Jul. 3, 2013, Office Action.
U.S. Appl. No. 13/782,549, Jun. 24, 2013, Office Action.
U.S. Appl. No. 13/782,717, Jun. 13, 2013, Office Action.
U.S. Appl. No. 13/782,986, Jun. 10, 2013, Office Action.
U.S. Appl. No. 13/782,957, Jun. 20, 2013, Office Action.
U.S. Appl. No. 13/782,807, Nov. 7, 2013, Office Action.
U.S. Appl. No. 13/782,549, Oct. 7, 2013, Office Action.
U.S. Appl. No. 13/782,717, Oct. 7, 2013, Office Action.
U.S. Appl. No. 13/782,986, Nov. 1, 2013, Notice of Allowance.
U.S. Appl. No. 13/782,957, Nov. 15, 2013, Office Action.
U.S. Appl. No. 14/166,569, filed Jan. 28, 2014 titled "Virtual Defragmentation in a Deduplication Vault".
U.S. Appl. No. 13/782,807, Jan. 17, 2014, Office Action.
U.S. Appl. No. 13/782,807, Mar. 13, 2014, Notice of Allowance.
U.S. Appl. No. 14/166,569, Mar. 14, 2014, Office Action.

* cited by examiner

500a

| Source Storage Location | Hash Value | Vault Storage Location |
|---|---|---|
| S1 | H1 | V13 |
| S2 | H2 | V23 |
| S6 | H3 | V24 |
| S7 | H4 | V7 |
| S8 | H5 | V8 |
| S11 | H6 | V9 |
| S12 | H7 | V10 |
| S13 | H8 | V11 |
| S14 | H9 | V12 |
| S15 | H10 | V22 |
| S16 | H11 | V3 |
| S17 | H4 | V7 |
| S18 | H5 | V8 |
| S19 | H10 | V22 |
| S24 | H4 | V7 |
| S25 | H5 | V8 |
| S26 | H1 | V13 |
| S27 | H2 | V23 |
| S28 | H2 | V23 |
| S29 | H1 | V13 |

*FIG. 5A*

| Source Storage Location | Hash Value | Vault Storage Location |
|---|---|---|
| S16 | H11 | V3 |
| S7 | H4 | V7 |
| S17 | H4 | V7 |
| S24 | H4 | V7 |
| S8 | H5 | V8 |
| S18 | H5 | V8 |
| S25 | H5 | V8 |
| S11 | H6 | V9 |
| S12 | H7 | V10 |
| S13 | H8 | V11 |
| S14 | H9 | V12 |
| S1 | H1 | V13 |
| S26 | H1 | V13 |
| S29 | H1 | V13 |
| S15 | H10 | V22 |
| S19 | H10 | V22 |
| S2 | H2 | V23 |
| S27 | H2 | V23 |
| S28 | H2 | V23 |
| S6 | H3 | V24 |

*FIG. 5B*

| Source Storage Location | Hash Value | Vault Storage Location |
|---|---|---|
| S16 | H11  | V3 |
| S7 | H4 | V7 |
| S8 | H5 | V8 |
| S11 | H6 | V9 |
| S12 | H7 | V10 |
| S13 | H8 | V11 |
| S14 | H9 | V12 |
| S1 | H1 | V13 |
| S15 | H10 | V22 |
| S2 | H2 | V23 |
| S6 | H3 | V24 |

RESTORING A BACKUP FROM A DEDUPLICATION VAULT STORAGE

FIELD

The embodiments disclosed herein relate to restoring a backup from a deduplication vault storage.

BACKGROUND

A storage is computer-readable media capable of storing data in blocks. Storages face a myriad of threats to the data they store and to their smooth and continuous operation. In order to mitigate these threats, a backup of the data in a storage may be created at a particular point in time to enable the restoration of the data at some future time. Such a restoration may become desirable, for example, if the storage experiences corruption of its stored data, if the storage becomes unavailable, or if a user wishes to create a second identical storage.

A storage is typically logically divided into a finite number of fixed-length blocks. A storage also typically includes a file system which tracks the locations of the blocks that are allocated to each file that is stored in the storage. The file system also tracks the blocks that are not allocated to any file. The file system generally tracks allocated and unallocated blocks using specialized data structures, referred to as file system metadata. File system metadata is also stored in designated blocks in the storage.

Various techniques exist for backing up a source storage. One common technique involves backing up individual files stored in the source storage on a per-file basis. This technique is often referred to as file backup. File backup uses the file system of the source storage as a starting point and performs a backup by writing the files to a backup storage. Using this approach, individual files are backed up if they have been modified since the previous backup. File backup may be useful for finding and restoring a few lost or corrupted files. However, file backup may also include significant overhead in the form of bandwidth and logical overhead because file backup requires the tracking and storing of information about where each file exists within the file system of the source storage and the backup storage.

Another common technique for backing up a source storage ignores the locations of individual files stored in the source storage and instead simply backs up all allocated blocks stored in the source storage. This technique is often referred to as image backup because the backup generally contains or represents an image, or copy, of the entire allocated contents of the source storage. Using this approach, individual allocated blocks are backed up if they have been modified since the previous backup. Because image backup backs up all allocated blocks of the source storage, image backup backs up both the blocks that make up the files stored in the source storage as well as the blocks that make up the file system metadata. Also, because image backup backs up all allocated blocks rather than individual files, this approach does not necessarily need to be aware of the file system metadata or the files stored in the source storage, beyond utilizing minimal knowledge of the file system metadata in order to only back up allocated blocks since unallocated blocks are not generally backed up.

An image backup can be relatively fast compared to file backup because reliance on the file system is minimized. An image backup can also be relatively fast compared to a file backup because seeking is reduced. In particular, during an image backup, blocks are generally read sequentially with relatively limited seeking. In contrast, during a file backup, blocks that make up individual files may be scattered, resulting in relatively extensive seeking.

One common problem encountered when backing up multiple similar source storages to the same backup storage using image backup is the potential for redundancy within the backed-up data. For example, if multiple source storages utilize the same commercial operating system, such as WINDOWS® XP Professional, they may store a common set of system files which will have identical blocks. If these source storages are backed up to the same backup storage, these identical blocks will be stored in the backup storage multiple times, resulting in redundant blocks. Redundancy in a backup storage may increase the overall size requirements of the backup storage and increase the bandwidth overhead of transporting data to the backup storage.

Another common problem encountered after backing up a source storage to a backup storage using image backup is the potential for local redundancy within a backup. For example, when restoring a backup of a source storage that includes local redundant data, the bandwidth overhead of transporting data to a restore storage may be increased.

The subject matter claimed herein is not limited to embodiments that solve any disadvantages or that operate only in environments such as those described above. Rather, this background is only provided to illustrate one example technology area where some embodiments described herein may be practiced.

SUMMARY

In general, example embodiments described herein relate to restoring a backup from a deduplication vault storage. The example methods disclosed herein may be employed to reduce the number and duration of seek operations performed on the vault storage during the restoring of a backup. Reducing the number and duration of the seek operations reduces the total time spent retrieving the backup from the vault storage when restoring the backup.

In one example embodiment, a method of restoring a backup from a deduplication vault storage includes various steps. First, entries in a list of unique blocks in a backup of a source storage at a point in time are ordered according to locations of corresponding unique blocks as stored in a vault storage. Then, the corresponding unique blocks are read in the order from the vault storage. Next, communication is established between the vault storage and a restore storage. Then, the corresponding unique blocks are stored in the restore storage.

In another example embodiment, a method of restoring a backup from a deduplication vault storage includes various steps. First, entries in a list of unique blocks in a backup of a source storage at a point in time are ordered according to locations of corresponding unique blocks as stored in a vault storage. Then, the corresponding unique blocks are read in the order from the vault storage. Next, communication is established between the vault storage and a restore storage. Then, a single copy of each corresponding unique block is stored in the restore storage. Next, communication is discontinued between the vault storage and the restore storage. Then, each block that is a local duplicate block is read from the restore storage. Next, one or more additional copies of each local duplicate block is stored in the restore storage.

In yet another example embodiment, a method of restoring a backup from a deduplication vault storage includes various steps. First, entries in a list of unique blocks in a backup of a source storage at a point in time are ordered according to locations of corresponding unique blocks as stored in a vault storage. Next, the corresponding unique blocks are read in the order from the vault storage. Then, communication is established between the vault storage and a restore storage. Next, before discontinuing communication between the vault storage and the restore storage, a single copy of each corresponding unique block is stored in the restore storage and one or more additional copies of each local duplicate block is stored in the restore storage.

It is to be understood that both the foregoing general description and the following detailed description are exemplary and explanatory and are not restrictive of the invention, as claimed.

BRIEF DESCRIPTION OF THE DRAWINGS

Example embodiments will be described and explained with additional specificity and detail through the use of the accompanying drawings in which:

FIG. 5A is a schematic block diagram illustrating a table listing blocks in the backup of the source storage of FIG. 3 as stored in the vault storage of FIG. 4 ordered according to the original locations of the blocks as stored in the source storage;

FIG. 5B is a schematic block diagram illustrating the table of FIG. 5A ordered according to the locations of the blocks as stored in the vault storage;

FIG. 6A is a schematic block diagram illustrating an example restore storage having been restored to the state of the source storage of FIG. 3 according to a first implementation of the example method of FIG. 7;

FIG. 6B is a schematic block diagram illustrating an example restore storage having been restored to the state of the source storage of FIG. 3 according to a second implementation of the method of FIG. 7.

DESCRIPTION OF EMBODIMENTS

Some embodiments described herein relate to restoring a backup from a deduplication vault storage. The example methods disclosed herein may be employed to reduce the number and duration of seek operations performed on the vault storage during the restoring of a backup. Reducing the number and duration of the seek operations reduces the total time spent retrieving the backup from the vault storage when restoring the backup.

The term "storage" as used herein refers to computer-readable media, or some logical portion thereof such as a volume, capable of storing data in blocks. The term "block" as used herein refers to a fixed-length discrete sequence of bits. The term "run" as used herein refers to one or more blocks stored sequentially on a storage. The term "backup" when used herein as a noun refers to a copy or copies of one or more blocks from a storage. The term "local duplicate block" as used herein refers to an allocated duplicate block within a backup of a single storage.

Figure 1:
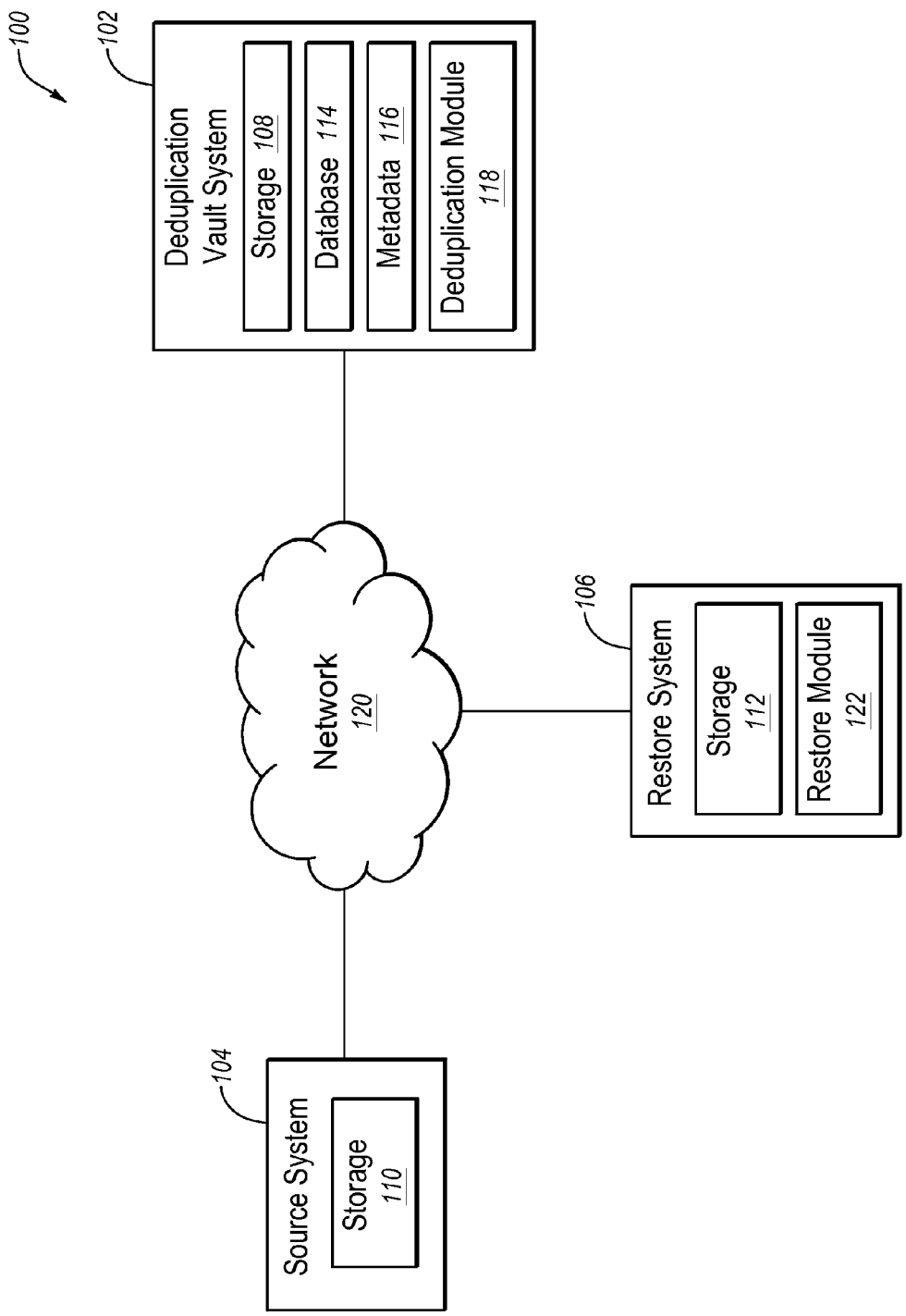
FIG. 1 is a schematic block diagram illustrating an example deduplication backup system.

FIG. 1 is a schematic block diagram illustrating an example deduplication backup system 100. As disclosed in FIG. 1, the example system 100 includes a deduplication vault system 102, a source system 104, and a restore system 106. The systems 102, 104, and 106 include storages 108, 110, and 112, respectively. The deduplication vault system 102 also includes a database 114, metadata 116, and a deduplication module 118. The restore system 106 also includes a restore module 122. The systems 102, 104, and 106 are able to communicate with one another over a network 120.

Each system 102, 104, and 106 may be any computing device capable of supporting a storage and communicating with other systems including, for example, file servers, web servers, personal computers, desktop computers, laptop computers, handheld devices, multiprocessor systems, microprocessor-based or programmable consumer electronics, smartphones, digital cameras, hard disk drives, and flash memory drives. The network 120 may be any wired or wireless communication network including, for example, a Local Area Network (LAN), a Metropolitan Area Network (MAN), a Wide Area Network (WAN), a Wireless Application Protocol (WAP) network, a Bluetooth network, an Internet Protocol (IP) network such as the internet, or some combination thereof.

Prior to performance of the example methods disclosed herein, the deduplication module 118 may create a backup of the source storage 110 by storing a single copy of each allocated block of the source storage 110 in the vault storage 108. The database 114 and the metadata 116 may be employed to track information related to the source storage 110, the vault storage 108, and the backup of the source storage 110 that is stored in the vault storage 108. For example, the creation of the backup may be accomplished by performing the analysis phase and the backup phase disclosed in related U.S. patent application Ser. No. 13/782,549, titled "MULTIPHASE DEDUPLICATION," which was filed on Mar. 1, 2013 and is expressly incorporated herein by reference in its entirety. In this example, the database 114 and the metadata 116 are identical in structure and function to the database 500 and the metadata 700 disclosed in this related application.

Subsequently, during performance of the example methods disclosed herein, the deduplication module 118 and/or the restore module 122 may restore each block that was stored in the source storage 110 at the point in time to the restore storage 112. As discussed in greater detail below, the example methods disclosed herein may be employed to reduce the number and duration of seek operations performed on the vault storage 108 during the restoring of the backup. Reducing the number and duration of the seek operations reduces the total time spent retrieving the backup from the vault storage 108 when restoring the backup.

In one example embodiment, the deduplication vault system 102 may be a file server, the source system 104 may be a first desktop computer, the restore system 106 may be a second desktop computer, and the network 120 may include the internet. In this example embodiment, the file server may be configured to periodically back up the storage of the first desktop computer over the internet. The file server may then be configured to restore the most recent backup to the storage of the second desktop computer over the internet if the first desktop computer experiences corruption of its storage or if the first desktop computer's storage becomes unavailable.

Although only a single storage is disclosed in each of the systems 102, 104, and 106 in FIG. 1, it is understood that any of the systems 102, 104, or 106 may instead include two or more storages. Further, although the systems 102, 104, and 106 are disclosed in FIG. 1 as communicating over the network 120, it is understood that the systems 102, 104, and 106 may instead communicate directly with each other. For example, in some embodiments any combination of the systems 102, 104, and 106 may be combined into a single system. Also, although the storages 108, 110, and 112 are disclosed as separate storages, it is understood that any combination of the storages 108, 110, and 112 may be combined into a single storage. For example, in some embodiments the storage 110 may function as both a source storage during the creation of a backup and a restore storage during a restore of the backup, which may enable the storage 110 to be restored to a state of an earlier point in time. Further, although the deduplication module 118 and the restore module 122 are the only modules disclosed in the example system 100 of FIG. 1, it is understood that the functionality of the deduplication module 118 and the restore module 122 may be replaced or augmented by one or more similar modules residing on any of the systems 102, 104, and 106. Finally, although only a single source storage and a single restore storage are disclosed in the example system 100 of FIG. 1, it is understood that the deduplication vault system 102 of FIG. 1 is configured to simultaneously back up or restore multiple source storages. For example, the greater the number of storages that are backed up to the vault storage 108 of the deduplication vault system 102, the greater the likelihood for reducing redundancy and overall size of the data being backed up, resulting in corresponding decreases in the bandwidth overhead of transporting data to the backup storage.

Having described one specific environment with respect to FIG. 1, it is understood that the specific environment of FIG. 1 is only one of countless environments in which the example methods disclosed herein may be employed. The scope of the example embodiments is not intended to be limited to any particular environment.

Figure 2:
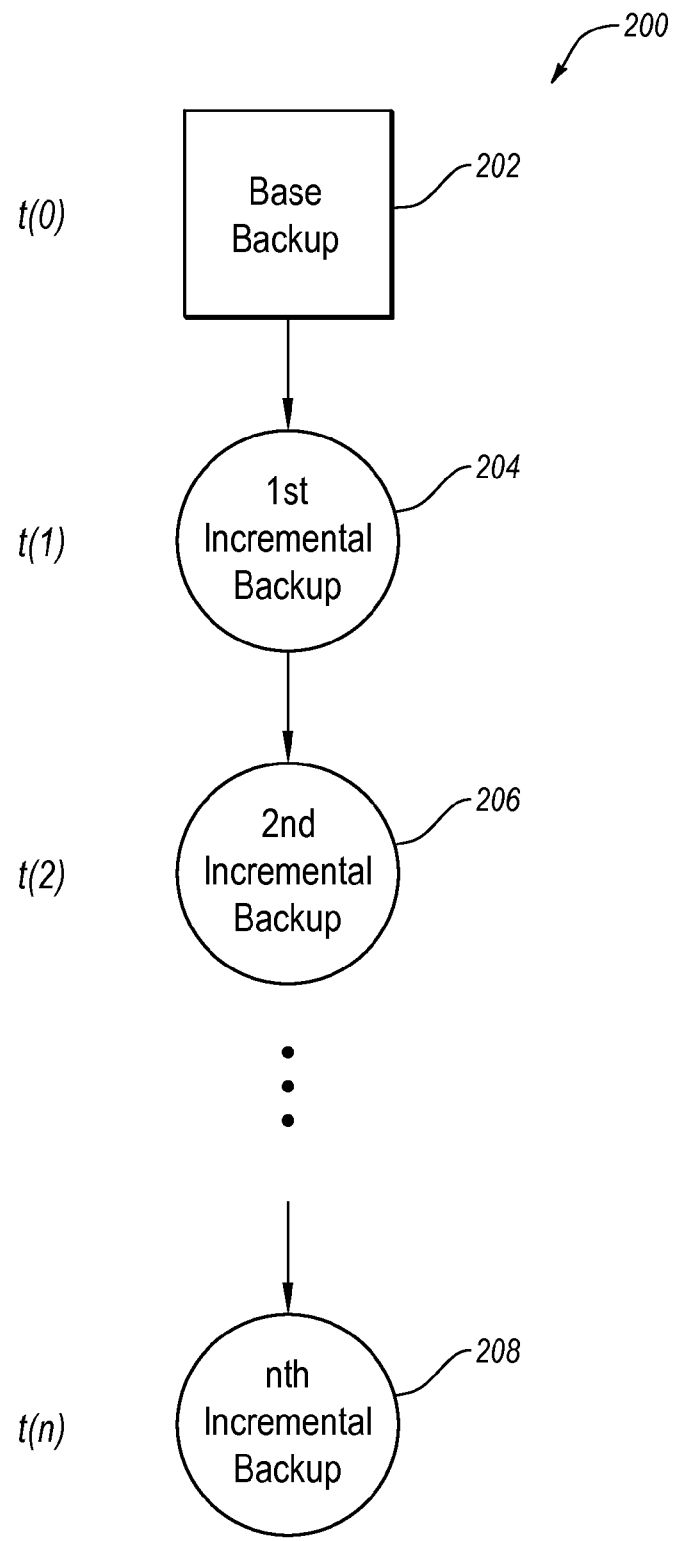
FIG. 2 is a schematic flowchart illustrating an example method for creating a base backup and multiple incremental backups of a source storage.

FIG. 2 is a schematic flowchart illustrating an example method 200 for creating a base backup and multiple incremental backups of a source storage. The method 200 may be implemented, in at least some embodiments, by the deduplication module 118 of the deduplication vault system 102 of FIG. 1. For example, the deduplication module 118 may be configured to execute computer instructions to perform operations of creating a base backup and multiple incremental backups of the source storage 110, as represented by one or more of steps 202-208 of the method 200. Although illustrated as discrete steps, various steps may be divided into additional steps, combined into fewer steps, or eliminated, depending on the desired implementation. The method 200 will now be discussed with reference to FIGS. 1 and 2.

The method 200 may begin at step 202, in which a base backup is created to capture the state at time t(0). For example, the deduplication module 118 may create a base backup of all allocated blocks of the source storage 110 as allocated at time t(0) and store the allocated blocks in the vault storage 108. The state of the source storage 110 at time t(0) may be captured using snapshot technology in order to capture the data stored in the source storage 110 at time t(0) without interrupting other processes, thus avoiding downtime of the source storage 110. The base backup may be very large depending on the size of the source storage 110 and the number of allocated blocks at time t(0). As a result, the base backup may take a relatively long time to create and consume a relatively large amount of space in the vault storage 108.

At steps 204 and 206, 1st and 2nd incremental backups are created to capture the states at times t(1) and t(2), respectively. For example, the deduplication module 118 may create a 1st incremental backup of only changed allocated blocks of the source storage 110 present at time t(1) and store the changed allocated blocks in the vault storage 108, then later create a 2nd incremental backup of only changed allocated blocks of the source storage 110 present at time t(2) and store the changed allocated blocks in the vault storage 108. The states of the source storage 110 at times t(1) and t(2) may again be captured using snapshot technology, thus avoiding downtime of the source storage 110. Each incremental backup includes only those allocated blocks from the source storage 110 that were changed after the time of the previous backup. Thus, the 1st incremental backup includes only those allocated blocks from the source storage 110 that changed between time t(0) and time t(1), and the 2nd incremental backup includes only those allocated blocks from the source storage 110 that changed between time t(1) and time t(2). In general, as compared to the base backup, each incremental backup may take a relatively short time to create and consume a relatively small storage space in the vault storage 108.

At step 208, an nth incremental backup is created to capture the state at time t(n). For example, the deduplication module 118 may create an nth incremental backup of only changed allocated blocks of the source storage 110 present at time t(n), using snapshot technology, and store the changed allocated blocks in the vault storage 108. The nth incremental backup includes only those allocated blocks from the source storage 110 that changed between time t(n) and time t(n−1).

As illustrated in the example method 200, incremental backups may be created on an ongoing basis. The frequency of creating new incremental backups may be altered as desired in order to adjust the amount of data that will be lost should the source storage 110 experience corruption of its stored data or become unavailable at any given point in time. The data from the source storage 110 can be restored to the state at the point in time of a particular incremental backup by applying the backups from oldest to newest, namely, first applying the base backup and then applying each successive incremental backup up to the particular incremental backup.

Although only allocated blocks are backed up in the example method 200, it is understood that in alternative implementations both allocated and unallocated blocks may be backed up during the creation of a base backup or an incremental backup. This is typically done for forensic purposes, because the contents of unallocated blocks can be interesting where the unallocated blocks contain data from a previous point in time when the blocks were in use and allocated. Therefore, the creation of base backups and incremental backups as disclosed herein is not limited to allocated blocks but may also include unallocated blocks.

Further, although only a base backup and incremental backups are created in the example method 200, it is understood that the source storage 110 may instead be backed up by creating a base backups and decremental backups. Decremental backups are created by initialing creating a base backup to capture the state at a previous point in time, then updating the base backup to capture the state at a subsequent point in time by modifying only those blocks in the base backup that changed between the previous and subsequent points in time. Prior to the updating of the base backup, however, the original blocks in the base backup that correspond to the changed blocks are copied to a decremental backup, thus enabling restoration of the source storage 110 at the previous point in time (by restoring the updated base backup and then restoring the decremental backup) or at the subsequent point in time (by simply restoring the updated base backup). Since restoring a single base backup is generally faster than restoring a base backup and one or more incremental or decremental backups, creating decremental backups instead of incremental backups may enable the most recent backup to be restored more quickly since the most recent backup is always a base backup or an updated base backup instead of potentially being an incremental backup. Therefore, the creation of backups as disclosed herein is not limited to a base backup and incremental backups but may also include a base backup and decremental backups.

Figure 3:
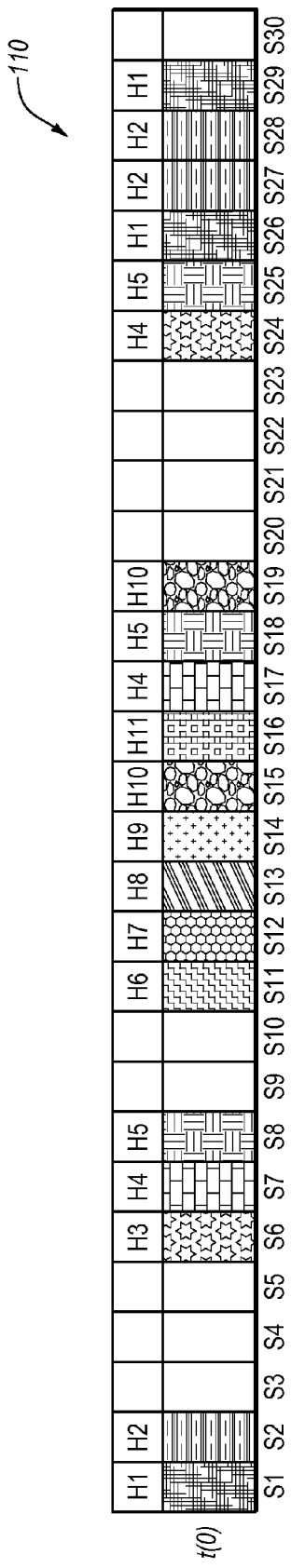
FIG. 3 is a schematic block diagram illustrating an example source storage.
Figure 4:
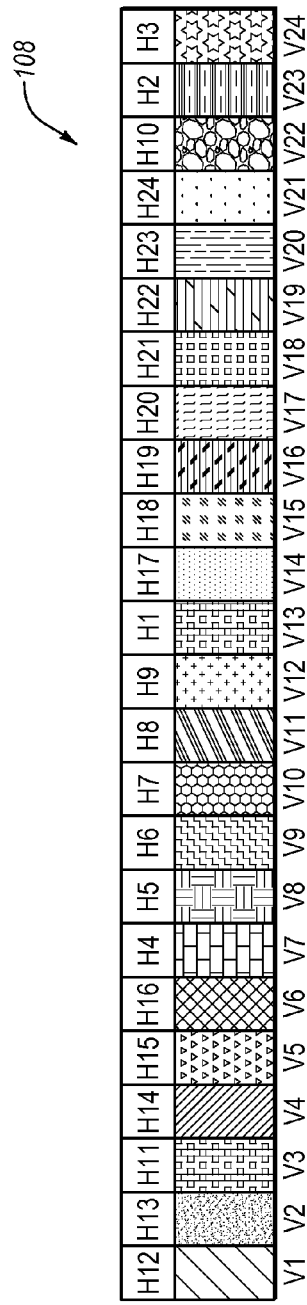
FIG. 4 is a schematic block diagram illustrating an example vault storage that includes a base backup of the example source storage of FIG. 3.

FIG. 3 is a schematic block diagram illustrating the example source storage 110 and FIG. 4 is a schematic block diagram illustrating the example vault storage 108 that includes a base backup of the example source storage 110. As disclosed in FIG. 3, the source storage 110 is partitioned into a physical layout of blocks S1-S30. Similarly, as disclosed in FIG. 4, the vault storage 108 is also partitioned into a physical layout of blocks V1-V24. In some example embodiments, the size of each block is 4096 bytes, although any other block size could instead be employed. The size of each block may be configured to match the standard sector size of a file system of the vault storage 108 and the source storage 110. Although the vault storage 108 is illustrated as having a fewer number of blocks than the source storage 110, in some example embodiments, the vault storage 108 may have a greater number of blocks than the source storage 110 in order to allow multiple storages to be backed up in the vault storage 108. Further, although the source storage 110 and the vault storage 108 are illustrated as having only 24 and 30 blocks, respectively, in some example embodiments the source storage 110 and the vault storage 108 may each have millions or even billions of blocks, or more.

The blank blocks illustrated in FIG. 3 represent unallocated blocks. Each block illustrated with a unique pattern in FIGS. 3 and 4 represents a unique allocated block. As disclosed in FIGS. 3 and 4, each unique allocated block may further be represented by a unique hash value H1-H30. The hash values may be a cryptographic hash value between 128 bytes and 512 bytes in length, for example. Alternatively, the hash values may be a computable check sum, which may allow for better performance with nonaligned writes for example. A hash value can be employed to represent a block of data in a dramatically-compressed data value. For example, a cryptographic hash value of a 4096-byte block may be represented using only 128 bytes.

Figure 5C:
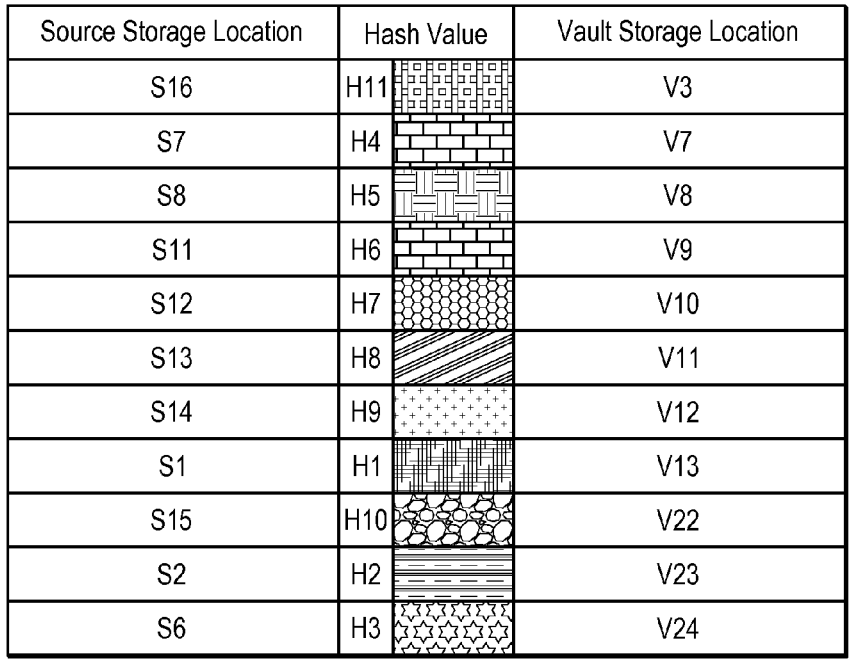
FIG. 5C is a schematic block diagram illustrating the table of FIG. 5B with only the entries corresponding to the first original location of each unique block as stored in the source storage.

FIG. 5A is a schematic block diagram illustrating a table 500a listing blocks in the backup of the source storage 110 as stored in the vault storage 108. The table 500a is ordered according to the original locations of the blocks as stored in the source storage 110. FIG. 5B is a schematic block diagram illustrating a table 500b which is identical to the table 500a of FIG. 5A except that the table 500b is ordered according to the locations of the blocks as stored in the vault storage 108. FIG. 5C is a schematic block diagram illustrating a table 500c that is identical to the table 500b of FIG. 5B except that the table 500c only includes the entries corresponding to the first original location of each unique block as stored in the source storage 110.

As disclosed in FIGS. 3, 4, and 5A, a base backup may be created of the source storage 110 to capture the state of the source storage 110 at the time t(0). During the creation of the backup, only a single copy of each unique allocated block present in the source storage 110 at time t(0) will be stored in the vault storage 108. Accordingly, since there are only eleven unique allocated blocks among the 20 allocated blocks and the 10 unallocated blocks in the source storage 110, a base backup of the 30 blocks of the source storage 110 can be stored in the vault storage 108 by storing only the eleven unique allocated blocks in the vault storage 108, or verifying that each unique allocated block is already stored in the vault storage 108. Therefore, the vault storage 108 is configured not only to avoid duplication of blocks across backups from separate storages, but also to avoid duplication of blocks within a single storage.

The base backup may be defined as illustrated in the table 500a in FIG. 5A by associating the original location(s) in the source storage 110, and the corresponding location in the vault storage 108, of each of the unique allocated blocks. It is also noted that the size of the table in FIG. 5 may be reduced by tracking runs of blocks instead of only tracking single blocks, as is done in the metadata 116 discussed above in connection with FIG. 1. In practice, runs may have lengths of millions or even billions of blocks.

Although the table 500a in FIG. 5A is ordered according to the original locations of the blocks in the source storage 110 at time t(0), the tables 500b and 500c of FIGS. 5B and 5C are instead ordered according to the locations of the blocks as stored in the vault storage 108. The ordering of the entries in the tables 500b and 500c according to the locations of the blocks as stored in the vault storage 108 may reduce the number and duration of the seek operations performed on the vault storage 108 during the restoring of a backup, as discussed in greater detail below.

Figures 6A, 6B:
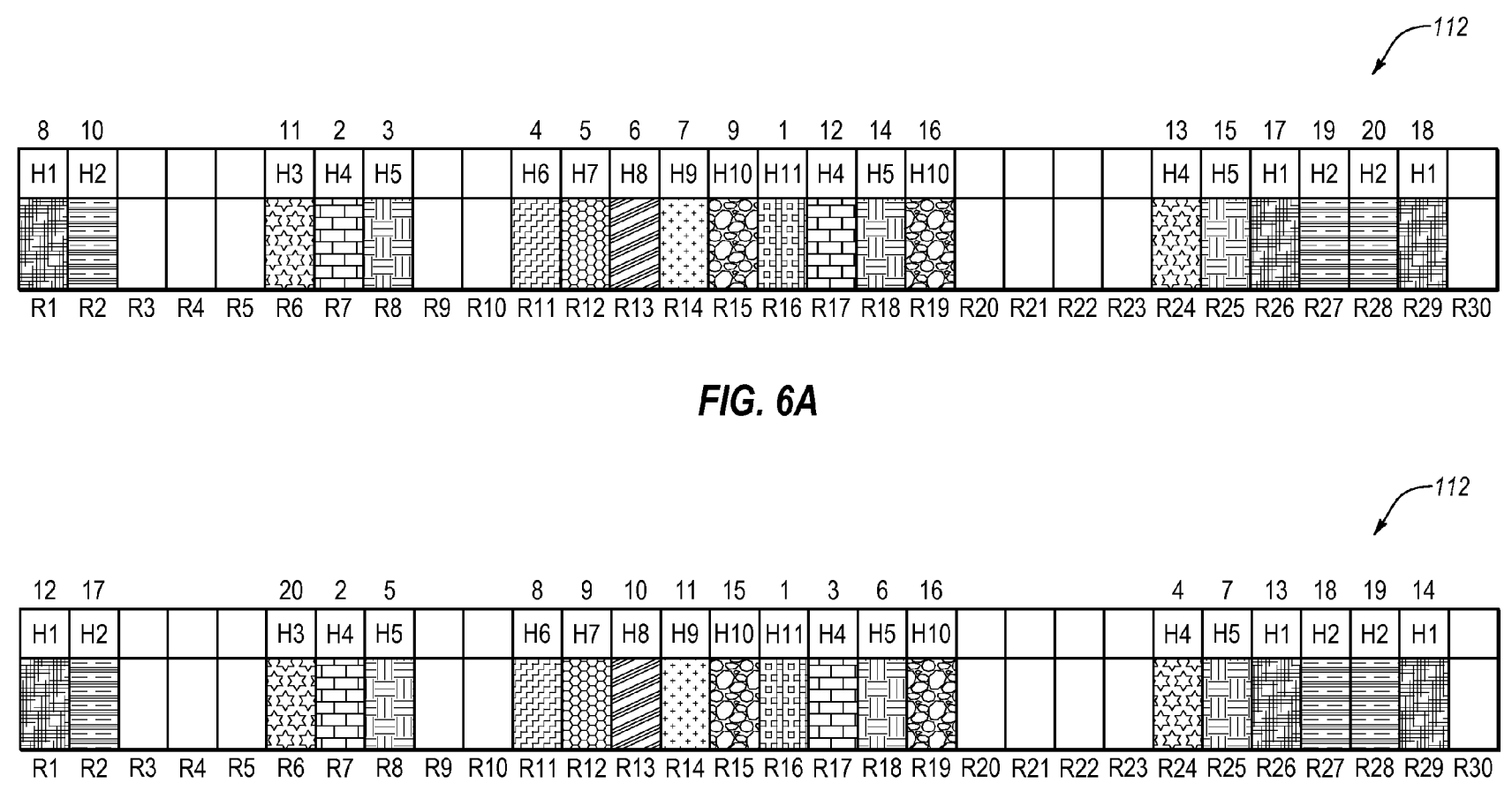

FIG. 6A is a schematic block diagram illustrating the example restore storage 112 having been restored to the state of the source storage 110 of FIG. 3 at the point in time t(0) according to a first implementation of the example method of FIG. 7, as discussed below. FIG. 6B is a schematic block diagram illustrating the example restore storage 112 having been restored to the state of the source storage 110 of FIG. 3 at the point in time t(0) according to a second example implementation of the method of FIG. 7, as discussed below. As disclosed in FIGS. 6A and 6B, the restore storage 112 is partitioned into a physical layout of blocks R1-R30. Although the restore storage 112 is illustrated as having only 30 blocks, in some example embodiments the restore storage 112 may have millions or even billions of blocks, or more. In some example embodiments, the restore storage 112 has the same number of blocks as the source storage 110 of FIG. 3 in order to allow a backup of the source storage 110 to be restored to the restore storage 112. In other example embodiments, the restore storage 112 may be the same physical storage as the source storage 110, which may enable the storage to be restored to a state of an earlier point in time. The integers along the top of each allocated block in FIGS. 6A and 6B represent the order in which the blocks are copied to the restore storage 112 from the vault storage 108 of FIG. 4 when restoring a backup of the source storage 110 of FIG. 3 during the method of FIG. 7, as discussed in greater detail below.

Figure 7:
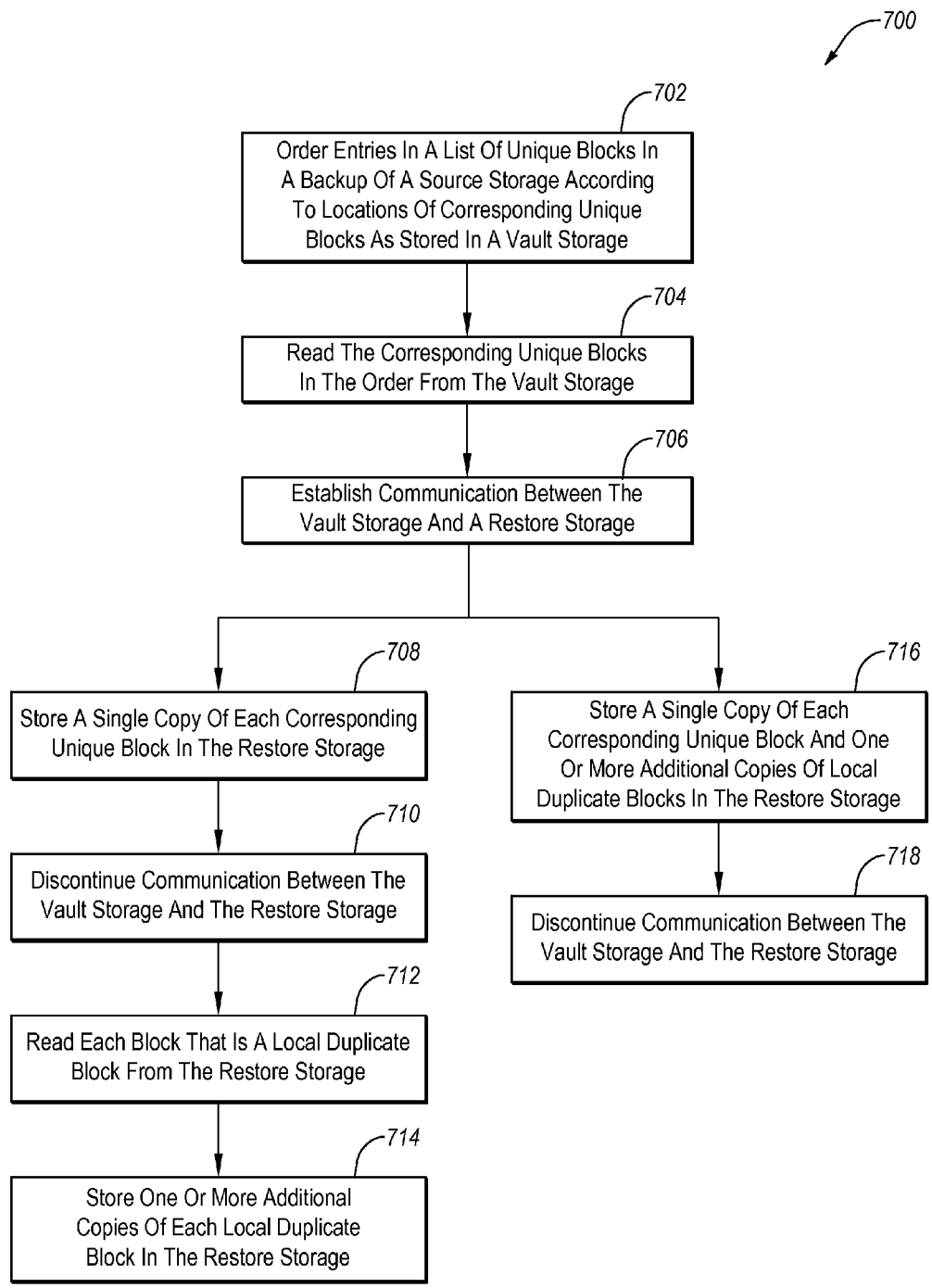
FIG. 7 is a schematic flowchart diagram of an example method of restoring a backup from a deduplication vault storage.

FIG. 7 is a schematic flowchart diagram of an example method 700 of restoring a backup from a deduplication vault storage. The method 700 may be implemented, in at least some embodiments, by the deduplication module 118 of the deduplication vault system 102 of FIG. 1 and/or by the restore module 122 of the restore system 106 of FIG. 1. For example, the deduplication module 118 and/or the restore module 122 may be configured to execute computer instructions to perform operations of restoring a backup from the vault storage 108, as represented by one or more of steps 702-718 of the method 700. Although illustrated as discrete steps, various steps may be divided into additional steps, combined into fewer steps, or eliminated, depending on the desired implementation. The method 700 will now be discussed with reference to FIGS. 1-7. Although the example implementations of the method 700 are disclosed below in connection with restoring a base backup, it is understood that the method 700 may also be employed to restore an incremental backup.

The method 700 may begin at step 702, in which entries in a list of unique blocks in a backup of a source storage are ordered according to the locations of corresponding unique blocks as stored in a vault storage. For example, the deduplication module 118 and/or the restore module 122 may order the entries in the table 500a, which represents a backup of the source storage 110 of FIG. 3 at time t(0), according to the locations of corresponding unique blocks as stored in the vault storage 108 of FIG. 4. This ordering may result in the table 500b. Also, where only entries of the first occurrence of each unique block from the source storage 110 are retained, this ordering may result in the table 500c.

Where the original table 500a is ordered according to the original locations of the blocks as stored in the source storage 110, and thus is ordered to minimize seeking during the reading of the blocks from the source storage 110 or during the writing of the blocks to the restore storages 112 of FIGS. 6A and 6B, the reordering of the table at step 702 results in a table that is instead optimized to minimize seeking during the reading of the blocks from the vault storage 108. Thus, while the time spent seeking during the writing of the blocks at the restore storage 112 may be increased due to the reordering at step 702, the reordering at step 702 may decrease the time spent seeking during the reading of the blocks at the vault storage 108. This tradeoff due to the reordering at step 702 redistributes a portion of the overhead of a restore operation from the vault storage 108 to the restore storage 112. Since the vault storage 108 may be accessed by multiple storages simultaneously for backup or restore operations, and thus the demand on the vault storage 108 may be greater than other storages in the system, redistributing a portion of the overhead of restore operations from the vault storage 108 to other storages may make the overall system 100 more balanced and therefore efficient.

At step 704 of the method 700, the corresponding unique blocks from the vault storage are read in order. For example, the deduplication module 118 and/or the restore module 122 may read the eleven unique blocks in the backup of the source storage 110 that are listed in the table 500c in order from the vault storage 108 of FIG. 4.

Reading these unique blocks from the vault storage 108 in the order of table 500c, which is the order in which the blocks are stored in the vault storage 108, reduces the number and duration of the seek operations performed on the vault storage 108. By reducing the number and duration of seek operations, the total time spent retrieving the backup from the vault storage 108 during the method 700 is also reduced.

In particular, and due in part to some of these blocks forming runs, these eleven blocks can be read in a total of three seek operations. Also, the duration of each of these three seek operations is reduced since each seek operation is directed to a block that is forward from the block most recently read. In contrast, if these unique blocks were read in the order of the table 500a, which is not in the order in which these blocks are stored in the vault storage 108, reading these eleven blocks would require a total of six seek operation. Also, the overall cost of these six seek operations would be increased since some of the seek operations are directed at blocks that are backward from the block most recently read, while others of the seek operations are directed at blocks that are forward from the block most recently read.

At step 706 of the method 700, communication is established between the vault storage and a restore storage. For example, the deduplication module 118 and/or the restore module 122 may establish communication between the vault storage 108 of FIG. 4 and the restore storage 112 of FIG. 6A or FIG. 6B. It is understood that the step 706 may be performed before, after, between, or simultaneously with the steps 702 and 704.

After step 706 of the method 700, the corresponding unique blocks read at the step 704 are stored in the restore storage by either performing the steps 708-714 or performing the steps 716 and 718.

At step 708, a single copy of each corresponding unique block is stored in the restore storage. For example, the deduplication module 118 and/or the restore module 122 may store a single copy of each of the eleven corresponding unique blocks listed in the table 500c in the "R" locations in the restore storage 112 of FIG. 6A corresponding to the "S" locations listed in the table 500c. These blocks may be copied to the restore storage 112 in the order that they are read from the vault storage 108, as indicated by the integers along the top of each of these blocks in FIG. 6A.

At step 710, the communication between the vault storage and the restore storage may be discontinued. For example, the deduplication module 118 and/or the restore module 122 may discontinue communication between the vault storage 108 of FIG. 4 and the restore storage 112 of FIG. 6A. This discontinuing of communication between the vault storage 108 and the restore storage 112 may free up a limited number of communication channels to the vault storage 108 or a limited amount of communication bandwidth with the vault storage 108 for communication with other storages, for example.

At step 712, each block that is a local duplicate block from the restore storage may be read. For example, the restore module 122 may read each of the blocks from the restore storage 112 of FIG. 6A listed in table 500c that is duplicated in the table 500b. In this example, the five local duplicate blocks have hash values of H4, H5, H1, H10, and H2.

At step 714, one or more additional copies of each local duplicate block are stored in the restore storage. For example, the restore module 122 may store one or more copies of each local duplicate blocks that was read at step 712 in the restore storage 112 of FIG. 6A. In one example, these local duplicate blocks may be copied in the order in which they were originally stored in the source storage 110. In this example, these local duplicate blocks may be copied in order into locations R17-R19 and then into R24-R29, as disclosed in FIG. 6A.

At the conclusion of steps 708-714, the backup of the source storage 110 at time t(0) has been restored to the restore storage 112. In addition to the reduction in the number and duration of seek operations performed on the vault storage 108, as discussed above, performance of the steps 708-714 may further reduce the amount of time that the restore storage 112 is communicating with the vault storage 108, which may free up communication channels or communication bandwidth for communications with other storages.

At step 716, a single copy of each corresponding unique block and one or more additional copies of each local duplicate block is stored in the restore storage. For example, the deduplication module 118 and/or the restore module 122 may store each of the blocks listed in the table 500b in the "R" locations in the restore storage 112 of FIG. 6B corresponding to the "S" locations listed in the table 500b. These blocks may be copied to the restore storage 112 in the order that they are read from the vault storage 108, as indicated by the integers along the top of each of these blocks in FIG. 6B. In this example, each corresponding unique block that is also a local duplicate block can be copied to every appropriate location in the restore storage 112 before moving on to the copying of the next corresponding unique block. For this reason, the unique block with a hash value H1 will be copied three times to locations R7, R17, and R24 before the step 716 moves on to copying the unique block with a hash value of H5. Thus, in step 716, local duplicate blocks may be read once from the vault storage 108 and copied to all appropriate locations in the restore storage 112, without being read again from the restore storage 112 as in step 712 discussed above.

At step 718, the communication between the vault storage and the restore storage may be discontinued. For example, the deduplication module 118 and/or the restore module 122 may discontinue communication between the vault storage 108 of FIG. 4 and the restore storage 112 of FIG. 6A.

At the conclusion of steps 716 and 718, the backup of the source storage 110 at time t(0) is restored to the restore storage 112. In addition to the reduction in the number and duration of seek operations performed on the vault storage 108, as discussed above, performance of the steps 716 and 718 may further eliminate the need to read any blocks from the restore storage 112 during the method 700.

The embodiments described herein may include the use of a special purpose or general purpose computer including various computer hardware or software modules, as discussed in greater detail below.

Embodiments described herein may be implemented using computer-readable media for carrying or having computer-executable instructions or data structures stored thereon. Such computer-readable media may be any available media that may be accessed by a general purpose or special purpose computer. By way of example, and not limitation, such computer-readable media may include non-transitory computer-readable storage media including RAM, ROM, EEPROM, CD-ROM or other optical disk storage, magnetic disk storage or other magnetic storage devices, or any other storage medium which may be used to carry or store desired program code in the form of computer-executable instructions or data structures and which may be accessed by a general purpose or special purpose computer. Combinations of the above may also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological steps, it is to be understood that the subject matter defined in the appended claims is not necessarily limited to the specific features or steps described above. Rather, the specific features and steps described above are disclosed as example forms of implementing the claims.

As used herein, the term "module" may refer to software objects or routines that execute on a computing system. The different modules described herein may be implemented as objects or processes that execute on a computing system (e.g., as separate threads). While the system and methods described herein are preferably implemented in software, implementations in hardware or a combination of software and hardware are also possible and contemplated.

All examples and conditional language recited herein are intended for pedagogical objects to aid the reader in understanding the example embodiments and the concepts contributed by the inventor to furthering the art, and are to be construed as being without limitation to such specifically-recited examples and conditions.

What is claimed is:

1. A method of restoring a backup from a deduplication vault storage, the method comprising:
    accessing entries in a list of unique blocks in a backup of a source storage at a point in time, the list initially being ordered in a first order, each of the entries in the list being associated with a hash value of the unique block;
    reordering the list into a second order that matches a numeric order of block addresses of corresponding unique blocks as stored in a vault storage;
    reading the corresponding unique blocks in the second order from the vault storage;
    establishing communication between the vault storage and a restore storage; and
    storing the corresponding unique blocks in the restore storage.

2. The method as recited in claim 1, wherein the source storage and the restore storage are the same storage.

3. The method as recited in claim 1, wherein the hash value associated with each of the entries is associated with:
    a location of the corresponding unique block in the vault storage; and
    an original location of the unique block in the source storage at the point in time.

4. The method as recited in claim 1, wherein storing the corresponding unique blocks in the restore storage includes:
    storing a single copy of each corresponding unique block in the restore storage;
    discontinuing communication between the vault storage and the restore storage;
    reading each block that is a local duplicate block from the restore storage; and
    storing one or more additional copies of the each local duplicate block in the restore storage.

5. The method as recited in claim 1, wherein storing the corresponding unique blocks in the restore storage includes, before discontinuing communication between the vault storage and the restore storage, storing a single copy of each corresponding unique block in the restore storage and storing one or more additional copies of each local duplicate block in the restore storage.

6. The method as recited in claim 1, wherein the backup of the source storage is a full backup of the source storage.

7. The method as recited in claim 1, wherein the backup of the source storage is an incremental backup of the source storage.

8. The method as recited in claim 1, wherein reading the corresponding unique blocks in the second order from the vault storage includes reading runs of the corresponding unique blocks in the second order from the vault storage.

9. A non-transitory computer-readable medium storing a program that causes a processor to execute the method as recited in claim 1.

10. A method of restoring a backup from a deduplication vault storage, the method comprising:
    accessing entries in a list of unique blocks in a backup of a source storage at a point in time, the list initially being ordered in a first order, each of the entries in the list being associated with a hash value of the unique block;
    reordering the list into a second order that matches a numeric order of block addresses of corresponding unique blocks as stored in a vault storage;
    reading the corresponding unique blocks in the second order from the vault storage;
    establishing communication between the vault storage and a restore storage;

storing a single copy of each corresponding unique block in the restore storage;

discontinuing communication between the vault storage and the restore storage;

reading each block that is a local duplicate block from the restore storage; and storing one or more additional copies of each local duplicate block in the restore storage.

11. The method as recited in claim 1, wherein the vault storage communicates with the source storage over the internet.

12. The method as recited in claim 10, wherein the source storage and the restore storage are the same storage.

13. The method as recited in claim 10, wherein the hash value associated with each of the entries is associated with:

a location of the corresponding unique block in the vault storage; and an original location of the unique block in the source storage at the point in time.

14. The method as recited in claim 10, wherein the vault storage communicates with the source storage over the internet.

15. A non-transitory computer-readable medium storing a program that causes a processor to execute the method as recited in claim 10.

16. A method of restoring a backup from a deduplication vault storage, the method comprising:

accessing in a list of unique blocks in a backup of a source storage at a point in time, the list initially being ordered in a first order, each of the entries in the list being associated with a hash value of the unique block;

reordering the list into a second order that matches a numeric order of block addresses of corresponding unique blocks as stored in a vault storage;

reading the corresponding unique blocks in the second order from the vault storage;

establishing communication between the vault storage and a restore storage; and before discontinuing communication between the vault storage and the restore storage, storing a single copy of each corresponding unique block in the restore storage and storing one or more additional copies of each local duplicate block in the restore storage.

17. The method as recited in claim 16, wherein the source storage and the restore storage are the same storage.

18. The method as recited in claim 16, wherein the hash value associated with each of the entries is associated with:

a location of the corresponding unique block in the vault storage; and an original location of the unique block in the source storage at the point in time.

19. The method as recited in claim 16, wherein the vault storage communicates with the source storage over the internet.

20. A non-transitory computer-readable medium storing a program that causes a processor to execute the method as recited in claim 16.

* * * * *